(12) United States Patent
Abkairov

(10) Patent No.: US 9,787,819 B2
(45) Date of Patent: Oct. 10, 2017

(54) TRANSCRIPTION OF SPOKEN COMMUNICATIONS

(71) Applicant: Microsoft Technology Licensing, LLC, Redmond, WA (US)

(72) Inventor: Nikolay Abkairov, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/858,648

(22) Filed: Sep. 18, 2015

(65) Prior Publication Data

US 2017/0085696 A1    Mar. 23, 2017

(51) Int. Cl.
*H04M 1/00* (2006.01)
*H04M 1/725* (2006.01)
*G06F 17/28* (2006.01)
*G06F 3/01* (2006.01)
*G10L 15/22* (2006.01)

(52) U.S. Cl.
CPC .......... *H04M 1/7255* (2013.01); *G06F 3/017* (2013.01); *G06F 17/28* (2013.01); *G10L 15/22* (2013.01); *H04M 1/72555* (2013.01); *G10L 2015/221* (2013.01)

(58) Field of Classification Search
CPC ......... G10L 15/20; G10L 15/02; G10L 15/16; G10L 15/22; G10L 2021/0135; H04B 7/0413; G06F 17/28; H04M 1/7255
USPC ........................................................ 455/563
See application file for complete search history.

(56) References Cited

U.S. PATENT DOCUMENTS

| | | | |
|---|---|---|---|
| 5,860,063 A | 1/1999 | Gorin et al. | |
| 5,883,986 A * | 3/1999 | Kopec | G06K 9/72 |
| | | | 382/155 |
| 6,820,055 B2 | 11/2004 | Saindon et al. | |
| 7,133,513 B1 | 11/2006 | Zhang | |
| 8,374,864 B2 | 2/2013 | Kerr | |
| 2006/0206526 A1 | 9/2006 | Sitomer | |
| 2008/0285731 A1 | 11/2008 | Mykhalchuk et al. | |
| 2009/0037171 A1 | 2/2009 | McFarland et al. | |

(Continued)

OTHER PUBLICATIONS

Crosby, John, "Transcribing Speech in Video with Adobe Premiere and After Effects", Published on: Mar. 5, 2010 Available at: http://www.realeyes.com/blog/2010/03/05/caption/.

(Continued)

*Primary Examiner* — Olumide T Ajibade Akonai
*Assistant Examiner* — Edward Zhang

(57) ABSTRACT

A portion of speech is captured when spoken by a near-end user. A near-end user terminal conducts a communication session, over a network, between the near-end user and one or more far-end users, the session including a message sent to the one or more far-end users. A vetting mechanism is provided via a touchscreen user interface of the near-end user terminal, to allow the near-end user to vet an estimated transcription of the portion of speech prior to being sent to the one or more far-end users in the message. According to the vetting mechanism: (i) a first gesture performed by the near-end user through the touchscreen user interface accepts the estimated transcription to be included in a predetermined role in the sent message, while (ii) one or more second gestures performed by the near-end user through the touchscreen user interface each reject the estimated transcription to be sent in the message.

20 Claims, 3 Drawing Sheets

(56) References Cited

U.S. PATENT DOCUMENTS

| | | | |
|---|---|---|---|
| 2010/0058200 A1* | 3/2010 | Jablokov | G06Q 30/02 715/752 |
| 2010/0141655 A1 | 6/2010 | Belinsky et al. | |
| 2011/0007077 A1* | 1/2011 | Kamath | H04L 51/10 345/473 |
| 2011/0022387 A1* | 1/2011 | Hager | G06Q 10/107 704/235 |
| 2012/0016671 A1 | 1/2012 | Jaggi et al. | |
| 2012/0303445 A1* | 11/2012 | Jablokov | G06Q 30/02 705/14.42 |
| 2012/0315009 A1 | 12/2012 | Evans et al. | |
| 2014/0037075 A1* | 2/2014 | Bouzid | H04M 3/42204 379/88.03 |
| 2015/0006172 A1 | 1/2015 | Alameh | |
| 2015/0032460 A1 | 1/2015 | Kang et al. | |
| 2015/0127346 A1 | 5/2015 | Gruenstein | |
| 2015/0279360 A1* | 10/2015 | Mengibar | G10L 15/18 704/257 |
| 2015/0312175 A1* | 10/2015 | Langholz | H04L 51/04 715/716 |

OTHER PUBLICATIONS

Mohney, Doug, "Real-Time Transcription: Translation Next Frontiers for VoIP", Retrieved on: Jul. 13, 2015 Available at: http://it.toolbox.com/blogs/voip-news/realtime-transcription-translation-next-frontiers-for-voip-65662.

Hecht, Randi, "About", Retrieved on: Jul. 13, 2015 Available at: http://www.intellitext.co/about.html#what-we-do.

Russell, Jon, "Google Translate Now Does Real-Time Voice and Sign Translations on Mobile", Published on: Jan. 14, 2015 Available at: http://techcrunch.com/2015/01/14/amaaaaaazing/.

"Welcome to Skype Translator Preview", Published on: Jun. 18, 2015 Available at: http://www.skype.com/en/translator-preview/.

"International Search Report and Written Opinion", Application No. PCT/US2016/050846, Dec. 5, 2016, 12 pages.

"Second Written Opinion", Application No. PCT/US2016/050846, Jul. 28, 2017, 5 pages.

* cited by examiner

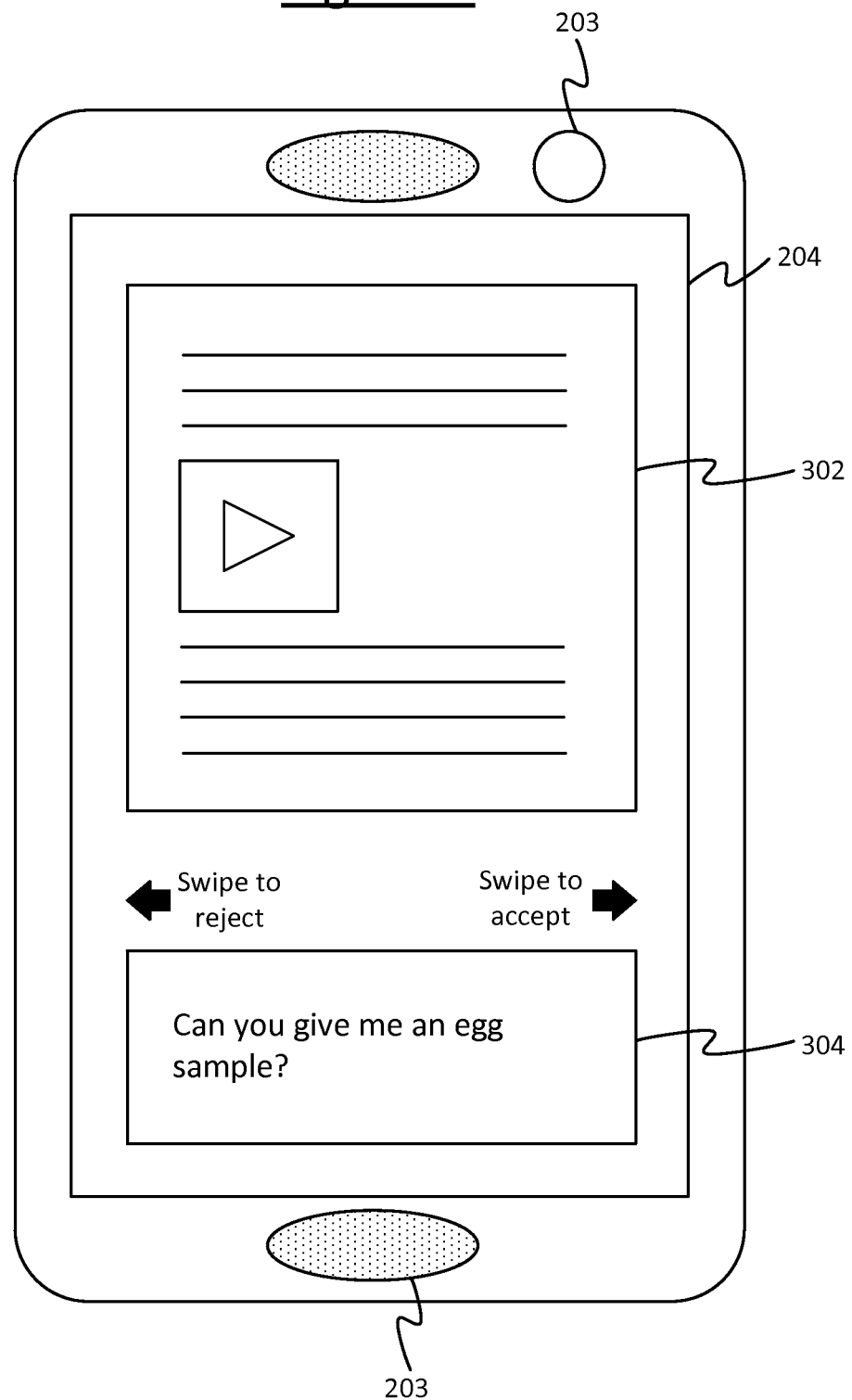

TRANSCRIPTION OF SPOKEN COMMUNICATIONS

BACKGROUND

Communications including a spoken audio component such as TV broadcasts, internet TV multicasts, or voice or video calls such as VoIP calls, often include a text transcription of the speech occurring in the audio speech. This could be for the for the benefit of a receiving user who is hard of hearing, or if the communication is being consumed at the received side in an environment where it is not appropriate to have the audio turned on or turned up to a clearly audible level (e.g. a quite public place where other people are present). Alternatively or additionally, the reason for the transcription could be because the sending user may simply prefer dictation rather than typing as a means of sending textual messages.

Different techniques are known for converting speech to text as part of a one-way or two-way communication session, including techniques for doing so quickly and even in real-time. Real time means dynamically, as-and-when the audio is being sent. That is, a part of the audio stream is still being transcribed at the transmit side while a preceding part of the same stream is still being played out at the receive side. This could be because the real-time stream is live and so it would be impossible to transcribe it in advance (future events to be transcribed in the stream have not yet occurred while a current part of the audio stream is being transcribed), or simply because there is not been enough time or it is not time efficient to transcribe in advance (e.g. that requires the transcription to be prepared, stored, retrieved and then synchronized with the playout).

For instance, in the case of one-way TV broadcasts, the transcription may be performed in real-time by a skilled human stenographer using a dedicated stenographer's keyboard (stenotype machine). With only a small delay the transcribed text may then be included in the broadcast to accompany the corresponding audio from which it was transcribed.

In the case of VoIP calls, it is known to include a voice recognition algorithm at the VoIP server. When the sending user speaks so as to send an audio speech signal to the transmit side via the server, the algorithm automatically transcribes the speech and includes this in the message sent to the receive side. As another example, a user could use voice recognition software to dictate a written note and then attach the note to a non-audio communication such as an email or IM (instant messaging) chat message.

SUMMARY

However, an issue arises when an initial transcription is not perfect or at least not an acceptable representation of what was spoken, but it is not easy to quickly correct the transcription on a timescale of the communication. Even communication sessions that are not live or real time per se can still be fast paced. E.g. consider a video messaging session where the user exchange short video clips much like IM messages. If the sending (near-end) client application automatically uses a speech recognition algorithm to include a text transcription of the speech in the video message, there is a good chance the algorithm will occasionally make a mistake (because such algorithms are not perfect, and/or because the user may not speak clearly, and/or because the quality of the captured audio may be poor). The sending (near-end) user may see that the transcription is wrong, but it takes him or her a relatively long time to correct it. E.g. imagine that the user has to use a mouse to highlight the incorrect part then use a keyboard to re-type. By this time the intended recipient (the far-end user) may have already moved on to a new topic, or sent another message uninformed by the message the near-end user was about to send.

A stenographer's keyboard would allow for fast editing, but aside from the fact that most users would not have the required skill, such a device is not practical to include in a normal everyday general purpose (and often mobile) user terminal such as a smartphone or tablet. Most normal user terminals do include either a mechanical or a virtual QUERTYUIOP keyboard, but this would be a cumbersome means for attempting to perform fast-paced, on-the-fly editing. Hence existing text editing means are not suitable for relatively fast-paced sessions such as video messaging applications, IM applications or even live voice or video calling applications.

To address these and/or other issues, according to one aspect disclosed herein, there is provided a user terminal such as a smartphone or tablet comprising the following features.

The user terminal comprises: a microphone for capturing a portion of speech spoken by a near-end user of said user terminal; a network interface for connecting to a communication network (e.g. the Internet); and a communication client application operable to conduct a communication session, over said network, between the near-end user and one or more far-end users of one or more far-end terminals. This includes the ability to cause an estimated transcription of said portion of speech to be sent in a message to the one or more far-end users as part of said communication session (note that the transcription may be generated by a speech recognition algorithm implemented locally at the near-end user terminal, in which case the message may include the transcription from the point of being sent from the near-end user terminal; or alternatively the transcription may be generated by a speech recognition algorithm implemented, in which case the message may be sent via the server and the transcription may be added at the server).

For instance the client may be a video messaging client, an IM client with dictation capability, or a voice or video calling client with automatic subtitling.

Further, the user terminal comprises a touchscreen user interface, which according to the present disclosure is exploited to enable fast transcription approval and even editing. That is, the client application is configured to implement a vetting mechanism to allow the near-end user to vet the estimated transcription via the touchscreen user interface prior to being sent in said message. According to said vetting mechanism: (i) a first gesture performed by the near-end user through the touchscreen user interface accepts the estimated transcription to be included in a predetermined role in the sent message, whilst (ii) one or more second gestures performed by the near-end user through the touchscreen user interface each reject the estimated transcription to be sent in said message. The predetermined role could for example be any of: (a) inclusion in a thumbnail image previewing a video message to the far-end user(s) (such as included in a push notification to the one or more far-end user terminals), or (b) as a subtitles to an audio and or video message, or (c) as the body of a dictated IM or email message.

As an example, while a video message is recorded, the audio may be transcribed and split into separate phrases (based on unvoiced periods). These phrases can then be shown each in a separate bubble overlaid over a video preview, before the video is sent. E.g. the user may tap on any phrase bubble to correct it (by choosing other probable variants supplied by voice recognition or by manually changing the text), or swipe it right to use it as notification text for this whole video (for richer push notifications), or swipe it left to delete the phrase and the video associated with it.

The transcription text may then be added as metadata into a video file to be sent to the receiving user(s), and in some embodiments may also be used to generate translated text and/or audio. Transcription or translation text and/or translation audio may be overlaid over the original video or audio before the video message is sent, and similar editing techniques (e.g. tap to edit and swipe right to choose as notification text) can be applied to the transcribed text before the video is sent.

In one particular application, the transcription may include a translation into a different language from a language in which the portion of speech is spoken. The disclosed techniques can be particularly (but not exclusively) useful in cases where a translation is to be performed based on the recognized speech. Here, a better vetted transcription can be especially relevant—because even if the initial speech-to-text transcription is in itself is imprecise, it's oftentimes still understandable; but, once translated, it can often be impossible to guess what the original meaning was. Consider also the effect in group chats where multiple participants want to consume messages translated to different languages at once. Here the cost of any original transcription mistake grows with each exchange, whereas this effect can be mitigated if the sender's transcription can be readily vetted in accordance with the present disclosure.

In further embodiments (whether the transcription is a plain transcription or also includes a translation), if the message is an audio and/or video message, the disclosed vetting process may be used not only as a mechanism for editing the transcription (i.e. the text), but also as mechanism for editing the actual audio and/or video content of the message itself. That is, if the sending user rejects the transcription, the audio and/or video of the message may be abandoned (not sent) along with the transcription; or alternatively only the particular portion of the audio and/or video corresponding to the transcribed speech may be edited out (i.e. cut out) from amongst other portions of the audio and/or video of the message. For instance, whilst more correct transcription (and in embodiments translation) make the media message easier to consume, using transcription bubbles as a means to quickly edit the video itself may also allow the user to create more concise message.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

To assist understanding of the present disclosure and to show how embodiments may be put into effect, reference is made by way of example to the accompanying drawings in which:

FIG. 3 is a schematic illustration of a user interface on a user terminal.

DETAILED DESCRIPTION

Figure 1:
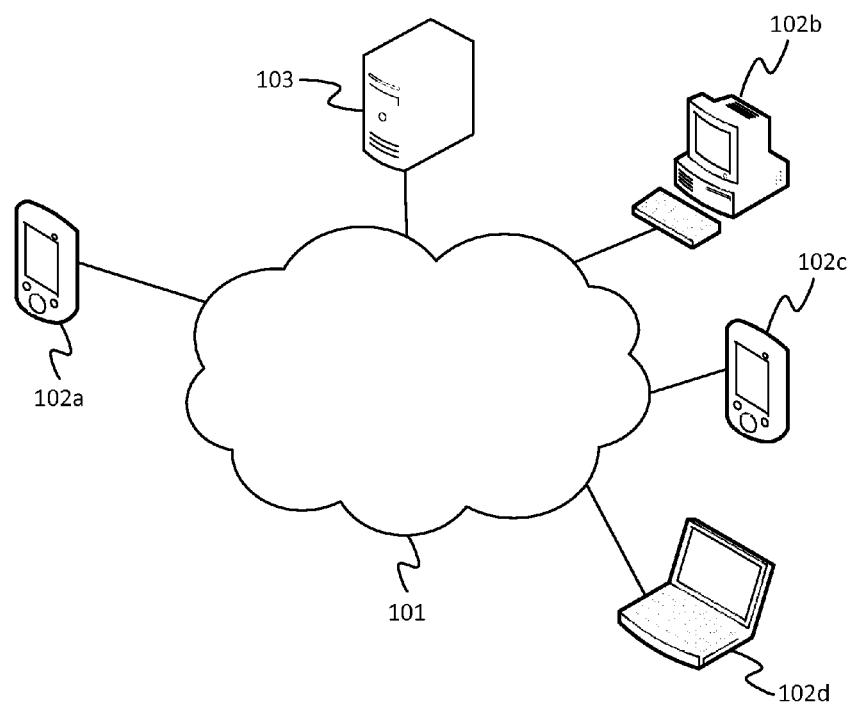
FIG. 1 is a schematic illustration of a communication system.

FIG. 1 shows an example of a communication system in accordance with embodiments of the present disclosure. The system comprises a network 101, such as a wide area internetwork such as the Internet; and a plurality of user terminals 102a-d each connected to the network 101 by a respective wired or wireless connection; and a optionally a server 103 also connected to the network 101. The following may be described in terms of the network 101 being the Internet, but it will be appreciated this is not necessarily limiting to all possible embodiments, e.g. alternatively or additionally the network 101 may comprise a company intranet or mobile a cellular network.

Each of the user terminals 102 may take any suitable form such as a smartphone, tablet, laptop or desktop computer (and the different user terminals 102 need not necessarily be the same type). Each of at least some of the user terminals 102a-d is installed with a respective instance of a communication client application that supports automatic voice to text transcription. For example, the application may be a video messaging application by which the respective users of two or more of the terminals 102a-d can establish a video messaging session between them over the Internet 101, and via said session exchange short video clips in a similar manner to the way users exchange typed textual messages in an IM chat session (and in embodiments the video messaging session also enables the users to include typed message). As another example, the client application may be an IM chat client supporting the ability to dictate the IM messages of the IM session. Or as yet another example, the client application may comprise a VoIP application for making voice and/or video calls, with the client application supporting automatic subtitling of speech spoken as part of the call. The following may be described in terms of a video messaging session, but it will be appreciated this is not necessarily limiting.

In embodiments, the message(s) referred to herein may be sent between user terminals 102 via a server 103, operated by a provider of the messaging service, typically also being a provider of the communication client application. Alternatively however, the message(s) may be sent directly over the Internet 101 without travelling via any server. Note also that where a server is involved, this refers to a logical entity being implemented on one or more physical server units at one or more geographical sites.

Figure 2:
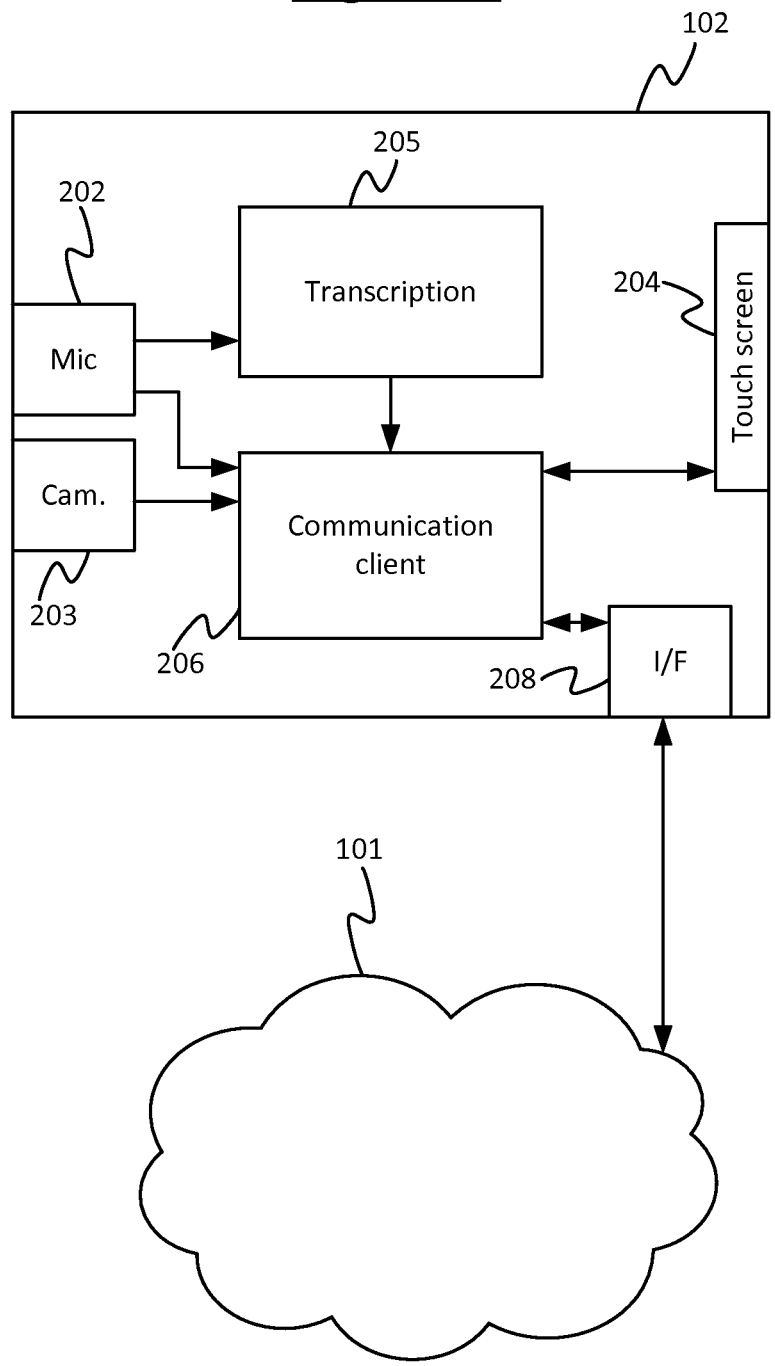
FIG. 2 is a schematic block diagram of a user terminal.

FIG. 2 shows a user terminal 102 in accordance with embodiments. At least a first of the user terminals 102a is configured in accordance with FIG. 2, and in embodiments one or more others 102b-d may also be configured this way. For purpose of illustration the following will be described in terms of the first user terminal 102a being a sending (near-end) user terminal sending a message to one or more other, receiving (far-end) terminals 102b-d. However, it will be appreciated that in embodiments the other user terminal(s) 102b-d can also send message to be received by the first user terminal 102a and/or others in a similar manner.

The user terminal 102a comprises a microphone 202, an optional video camera 103, a touchscreen 204, a transcription module 205, a communication client application 206, and a communication interface 208 for connecting to the Internet 101 via any suitable wired or wireless means. The microphone 202 may be built in to the housing of the user terminal 102a, or could be an external peripheral; and similarly for the video camera 203 if present. The microphone 202 is operatively coupled to the transcription module 205 and communication client 206, and thereby arranged to provide a audio signal captured by the microphone 202 from its surroundings to each of the transcription module 205 and client application 206. Similarly the video camera 203 (if present) is operatively coupled to the communication client 206 and thereby arranged to provide a video signal captured from its surroundings to the communication client 206.

The communication client application is operatively coupled to the transcription module 205, the touch screen 204 and the network interface 108. Each of the transcription module 205 and communication client 206 is implemented in the form of software stored on a memory of the user terminal 102a (comprising one or more storage media over one or more storage devices) and arranged for execution on a processing apparatus of the user terminal 102a (comprising one or more processor units). Note also that while the transcription module 205 is show here as a separate block than the communication client application, this does not necessarily mean it is separate from the communication client. In embodiments it may be a separate application or part of a separate application (e.g. dedicated voice recognition application) working in conjunction with the communication client application 206 (e.g. as a plug in), or alternatively the transcription module 105 may be part of the same application as the communication client 206. Nonetheless, for descriptive purposes, the functionality of the transcription module 105 will be described as providing an output to the communication client application 206.

Furthermore, note that as will be discussed in more detail later, the transcription module 205 can alternatively be implemented on software running on the server 103 (or a server), but for the purpose of discussion the following will first be described in terms of a transcription module 205 implemented on the sending (near-end) user terminal 102a.

In operation, the transcription module 205 receives the audio signal from the microphone 202. It comprises a voice recognition algorithm arranged to recognize human speech (language) in the audio signal, divide this into discrete phrases, e.g. based on unvoiced pauses in the speech and/or natural language processing (NLP) techniques, and covert these each of these phrases into a respective text transcription (i.e. a caption). In embodiments the transcription module 205 is also configured to output multiple different possible transcriptions of each of one or more of the phrases, and to output a respective estimate of the probability of each transcription being a correct transcription of the respective phrase detected in the audio. The process of speech recognition, including estimating associated probabilities, is in itself known in the art and will not be discussed in further detail herein.

The transcription module 205 is arranged to output its transcriptions of each respective phrase to the communication client application 206. The client application 206 also receives the audio signal and optionally video signal from the microphone 202 and video camera 203 respectively, directly or indirectly. The user of the sending user terminal 102a uses the application to formulate a message to send to the one or more far-end user terminals 102b-102d, e.g. a message. The message may be captured directly by the client application 206 from the including audio and optionally video stream as being captured from the microphone 202 and video camera 203 respectively. Alternatively the audio and (if applicable video) may have been captured from the microphone 202 and video camera 203 respectively at an earlier time or date by a separate application, and pre-stored on the sending user terminal 102 for sending to the far-end user. In this case the audio and/or video received by the client application 206 from the microphone 202 and/or camera 203 may take the form of a pre-stored video file pasted or loaded into the client application 206 (hence it was mentioned earlier that the audio and or video signal may be received "indirectly" from the microphone 202 or camera 203 respectively).

Either way, the communication client application 206 is configured to formulate the audio or video message so as to include the respective corresponding transcription (caption) from the transcription module 205 along with each the respective portion of speech in the audio or video message. This may be included as metadata in the message. Alternatively the transcription of each portion of speech may instead (or additionally) be included by incorporating each portion of the transcription into a corresponding portion of the video itself, graphically in the actual video data, i.e. into the actual pixels of the video (by drawing text on top of video frames themselves rather than including as metadata in the file). A consequence of this latter approach is a higher compatibility with existing video players and legacy clients. Note that this may involve post-processing (transcoding) of the video file to add each portion of transcription into the video with the appropriate timing In the case of short audio or video clips, it is possible that there is just one short caption per message. In this case the message only comprises one portion of speech, and there is no dividing up of the speech into multiple portions based on pauses or NLP or the like. This means no synchronization is necessary between the transcription and the audio or video content of the message—the receiving client at the far end terminal 102b-d can simply display the single transcribed caption for the whole message. Alternatively however, if there are multiple portions of speech to be represented by multiple different transcribed captions at different times, or even if a single capture is to be displayed for only some but not all of the message, then synchronization is needed. To facilitate the synchronization of the transcribed captions with the corresponding portions of the audio or video, the transcription module 205 is also configured to output timing information to the client application 206, wherein the timing information matches each transcribed caption to the corresponding range of times for which that caption is applicable. This timing information is then included in the message metadata (in modified or unmodified form). When the complementary client at the received side 102b-102d receives and plays out the audio or video message, it will use this timing information received in the metadata to display the relevant caption along with each respective portion of speech at the corresponding time in the played-out message.

Thus the system is able to provide a transcription of each of one or more phrases of speech, for the benefit of the user(s) of the one or more far-end user terminals 102b-120d.

Furthermore, the client application 206 is configured to enable the near-end (sending) user to quickly accept or reject, and in embodiments also edit, the transcription by means of simple fluid gestures input through the touchscreen 204, rather than having to use either a mechanical or virtual (touchscreen based) keyboard.

FIG. 3 shows a mock-up of an example of the front end of the user interface of the communication client 103 in accordance with embodiments, as would be presented to the user of the near-end user terminal 102a through the touchscreen 204. In the case of a video messaging application, the front-end comprises a first area 302 displaying recent message already sent and/or received in the video messaging conversation (e.g. a combination of textual messages and video messages), and a second area 304 showing a suggested transcription of a phrase in a video message that the sending (near-end) user is about to send. Here the second area 304 is shown as a plain text box, but it will be appreciated this is just schematic and various other design options are possible. For example the suggested transcription may be overlaid over a preview of the video about to be sent, and/or may take other shapes. E.g. in embodiments the user interface element 304 showing the transcribed phrase may take the form of a speech bubble displayed wholly or partially overlaid over the video image 302, or otherwise in association with it (e.g. below).

The user interface 204, 304 is thus configured, under control of the communication client application 206, to give the sending user of the near-end user terminal 102a the chance to review the transcription before sending to the far-end user(s) of the one or more far-end terminals 102b-d as part of the video messaging conversation. Further, it is also configured, again under control of the communication client application 206, to enable the sending user of the near-end user terminal 102a to either accept or reject the transcription using a quick gesture performed on the surface of the touch screen 204.

The acceptance could be just to approve the transcription to be included in the captioning or body of the message, or could be to select the transcription for some other particular purpose. For instance, in embodiments the message be a video message and may comprise two parts: a thumbnail, and the main video content of the message. The thumbnail part may be delivered to the one or more far-end user terminals 102b-d by means of a push notification, separately from of the main body of the message. In response, the client 206 at the (or each) far-end terminal displays the thumbnail as part of the relevant conversation in the message window 302 (referring now to the corresponding UI of the receive side client). In such cases, the first gesture performed at the near-end (transmit-side) terminal 102a does not just accept the transcription for inclusion in the message per se, but also accepts the transcription to be selected as a representative caption to be included in the thumbnail of the message, so as to be sent to the one or more far-end terminals 102b-d in the push notification.

The rejection may summon one or more alternative transcriptions for the user to approve or select from amongst, or may give the user the chance to re-speak the message, or may remove that portion of the video altogether from the resulting video message being sent. In embodiments, different types of gesture may cause different types of rejection.

For instance, the acceptance gesture may comprise swiping the suggested transcription 304 towards one side of the touchscreen 204, e.g. to the right; while one or more other, distinct gestures may each reject the suggested transcription.

For instance, if the user performs a first type of rejection gesture such as swiping the suggested transcription 304 towards the opposite side of the touchscreen 204, e.g. to the left, this may discard the suggested transcription and abandon the attempt to transcribe. In this case no transcription of the phrase in question is sent to any of the one or more far-end user terminals 102b-d. This may also include abandoning that segment of the message or abandoning the whole the message altogether (don't send the audio or video either).

Alternatively or additionally, if the user performs a second type of rejection gesture such as drawing a circle over the suggested transcription 304, this may give the sending user a chance to re-speak the phrase or the whole message (i.e. to say it again into the microphone 202). The client 206 then uses the transcription module 205 to obtain a transcription of the re-spoken phrase or message, and then repeat the described process of seeking the sending user's approval before sending the message. This can be particularly effective, as when people speak they tend to initially speak off the top of their heads without collecting their thoughts, whereas when someone re-speaks the same idea they often do so in a clearer, more concise or better expressed fashion, which may also be more easily recognized by the transcription module 205.

In either of the above embodiments, this may provide a mechanism for editing the actual media content (audio and/or video) of the message itself based on transcription—so that, while more correct transcription makes media message easier to consume, using transcription bubbles (or the like) as a means to quickly edit the video itself allow user to create more concise message. That is, the user may cut out or replace a temporal portion of the message based on having reviewed the attempted transcription. Thus in embodiments, E.g. perhaps the difficulty in translation makes the sending user think again about whether he or she actually has actually expressed him or herself as clearly or concisely as possible, and in response may decide to edit out or re-compose that portion of the message.

As another alternative or additional embodiment, if the user performs a third type of rejection gesture such as tapping the suggested transcription 203, then the communication client 206 may use the user interface 204, 304 to offer the sending user with one or more alternative transcriptions generated by the transcription module 205 (see above).

For instance, in embodiments, one of the rejection gestures such as tapping the suggested transcription 304 may summon a list of two or more alternative transcriptions, optionally listed together with their respective estimated probabilities as estimated by the transcription module (again see above). The sending user can then select an alternative option from the list by touching that option in the presented list on the touchscreen 204 (or perhaps also the option of rejecting all suggestions and abandoning sending, or re-speaking) E.g. in the example shown, the sending user actually said "Can you give me an example?", but the transcription module 205 output "Can you give me an egg sample". In this case tapping the incorrect transcription 304 may bring up a list of alternatives on the touch screen 204 such as:

["Can you give me an egg sample?" 33%]
"Can you give me an egg sandwich?" 29%
"Can you give me an example?" 27%
"Canyon grove means are ample" 5%
"Can you grieve mayonnaise ex maple?" 2%
. . .

(where the top, rejected possibility may or may not be displayed in the list). The sending user sees that the third option on the list (or second on the list of alternatives) is the one he or she intended, and/or sees this is the next most likely, and selects that option by touching it on the touchscreen 204. The communication client 206 then sends this alternative transcription in the message to the one or more far-end terminals 102b-d in place of the originally suggested transcription.

As a variant of the above, rather than summoning a list of multiple alternative options, a gesture of swiping the suggested transcription 304 in a certain direction, e.g. the opposite direction to the acceptance gesture or a right angles to it, could summon up (e.g. scroll to) only the next most likely transcription according to the probabilities generated by the transcription module 205. The sending user can then use the touch screen to accept or reject, e.g. using some or all of the same set of gestures as used to accept or reject the original suggestion. For instance in some embodiments, this can be repeated one or more times. I.e. if the sending user accepts the next most likely alternative, he or she accepts using the same gesture that he or she would have done if accepting the original (most likely) suggestion, or perhaps using a different gesture such as a tap; but if the sending user also rejects the next (second) most likely suggestion, then he or she can swipe again just as he or she did for the original (first, most likely) suggestion, in order to scroll through to the next most likely after than (third most likely), and so forth if need be. In this manner the sending user is present with each successively next most likely suggestion in turn, one at time, then swipes through each in order of descending likelihood (according to the probabilities computed by the transcription module 205).

In general various different gestures are possible. The touchscreen 204 has a surface on which the front-end of the user interface is displayed (i.e. which outputs the graphical information) and which also received the gesture-based user inputs through the user touching its surface. This surface defines a plane. In embodiments, the set of gestures used to accept and reject may comprise a one dimensional gesture (a tap), in which the user's finger does not move within the plane of the touchscreen 204 while touching the surface of the touchscreen 204, but rather only touches a single spot (point) in the plane of the touchscreen 204. In embodiments, each of one, some or all of the set of gestures used to accept and reject may be a one dimensional gesture, i.e. in which the user's finger moves only in a single straight-line direction in the plane of the touchscreen 204 while touching the surface of the touchscreen 204. In embodiments, each of one, some or all of the set of gestures used to accept and reject may be a two dimensional gesture, i.e. in which the user's finger moves in two dimensions (two axes) of a two-dimensional coordinate scheme defined in the plane of the touchscreen 204 while touching the surface of the touchscreen 204. In embodiments, each of one, some or all of the set of gestures used to accept and reject may comprise a single gesture, i.e. a gesture whereby the user's finder never leaves (never stops touching) the surface of the touchscreen 204 throughout the entire gesture.

In general any of the above types of gesture or others may be mapped to any of the acceptance of the suggested transcription 304 and the one or more types of rejection (abandon, try speaking again, see alternatives), in any combination.

As mentioned, in further embodiments, the accepted caption could also be used as a preview in a thumbnail at the receive side 120b-d. E.g. when the video message is displayed in the video conversation area 302 of the client running at one of the receiving user terminals 102b, a thumbnail of that message's video is displayed in the conversation 302 which the receiving user can select to play the video. In the thumbnail, the transcribed caption (that was accepted and sent by the sending user as discussed above) is also included in the thumbnail. E.g. this may be a caption representative of the topic of the message.

In yet further embodiments, the teachings above and elsewhere herein can also apply to translation, not just transcription. In this case as well as the voice recognition algorithm, the transcription module 205 also comprises a translation engine which translates the recognized text (after being transcribed by the voice recognition algorithm) from its original language to another language, e.g. Russian to English. The method of accepting or rejecting, and editing the translated version of the transcription can then proceed along the same lines as set out above. I.e. the translated transcription is presented to the sending user instead of the original-language transcription in the same area 304 of the user interface, and the sending user can then review and accept, reject or edit using the same system of gestures. As a modification relating specifically to translations, in embodiments where the probability of being correct is used (e.g. to present an ordered list of alternatives or to swipe through alternatives one at a time in order of probability), then this probability may be a combined probability also taking into account the probability that the transcription is correct and that the translation is correct.

It will be appreciated that the above embodiments have been described only by way of example.

For instance, while the above has been described in terms of a transcription module 205 (comprising the voice recognition algorithm and optionally translation engine) being implemented on the near-end (sending) user terminal 102a, in alternative embodiments the transcription and/or translation could instead be performed at the server 103 of the provider of the messaging service (or indeed another, third-party server). In embodiments, when a server is involved, the transcription or translation need not necessarily be inserted into the message at the point or origin of the audio and/or video, i.e. not necessarily at the near-end (sending) user terminal 102a. Instead for example, the message including the audio may be sent from the near-end user terminal 102a to the server 103, which applies the voice recognition algorithm there to generate the transcription, then inserts the transcription (including any synchronization information) as metadata into the message and forwards it to the one or more far-end (receiving) user terminals 102b-d for play-out. In order for the sending user to be able to review, the server 103 also sends a copy of the transcription (and in embodiments the one or more alternative transcriptions) back to the client application 206 on the sending user terminal 102a, and awaits an indication of the confirmation or rejection to be received from the client 206 on the sending user terminal 102a before forwarding to the one or more receiving user terminals 102b-d.

As another example, a similar arrangement could be put in place for translations. In embodiments both the transcription and the translation is applied at the server, in which case the arrangement works the same as described in the paragraph above, but with the transcriptions additionally being translated before being sent back to the sending terminal 102a for review and before being forwarded to the one or more receiving terminals 102b-d. Alternatively, the transcription could be applied by the voice recognition algorithm in the transcription module 205 implemented at the sending user terminal 102a, but the translation could be applied by the (or a) server 103, or by each of the receiving user terminals, to support multiple languages in a group chat.

Further, the scope of the disclosure is not limited to video messaging applications. In various embodiments, the communion session comprises a video messaging conversation, an IM chat conversation with dictation, or a video or voice call (e.g. VoIP call). The communication session may be a bidirectional communication session between the near-end user and the one or more far-end users as in the above examples, or may be a unidirectional communication such as an online TV, film or music streaming service. In embodiments, the message may be a live or other real-time stream, or could be a non real-time message sent as part of a communication session that is nonetheless fast-paced or time-critical, such as in a video messaging session or IM chat session. Further, in embodiments such as those discussed above, the communication client is also configured to send the audio and/or video recording of said portion of speech to the one or more far-end users as part of said communication session, but alternatively the transcribed text could instead replace the audio and/or video. In embodiments, the communication client is configured to send said message as a push notification to the one or more far-end users. In embodiments the communication session may be with only one far-end user, or alternatively the communication session may be with multiple far-end users.

Furthermore, as mentioned there are various actions that may be invoked by the sending user's rejection of a suggested transcription.

In embodiments, the communication client may be configured so as in response to the estimated transcription being rejected by one of said one or more second gestures indicating that the near-end user wishes to abandon transcription, to send no transcription of said portion of speech to the one or more far-end users. For instance the abandonment of the transcription may comprises abandoning the sending of the message altogether, or discarding from the sending a part of the message comprising said portion of speech (e.g. discarding a temporal part of the audio and/or video in the case of a video the message). Alternatively the abandonment may comprise sending the full audio or video message and only omitting the text of the transcription or at least the rejected portion of the transcription.

Alternatively or additionally, in embodiments, the communication client may be configured so as in response to the estimated transcription being rejected by one of said one or more second gestures indicating that the near-end user wishes to try again, to capture a re-spoken version of said portion of speech from the near-end user, to obtain a new transcription of the re-spoken version, and to provide the near-end user with an option via the touchscreen user interface to accept or reject the new transcription to be sent in said message.

Alternatively or additionally, in embodiments, the communication client may be configured so as in response to the estimated transcription being rejected by one of said one or more second gestures indicating that the near-end user wishes another suggestion, to present the near end-user with one or more alternative transcriptions of said portion of speech, and to provide the near-end user with an option via the touchscreen user interface to select one of the one or more alternative transcriptions to be sent in said message.

In one such embodiment, the client application may be operable to obtain a plurality of alternative transcriptions of said portion of speech, and for each a respective estimated probability of being correct; and the client application may be configured so as in response to the estimated transcription being rejected by said one of the one or more second gestures indicating that the near-end user wishes another suggestion, to present the near end-user, via the touchscreen user interface, with a list of at least some of the alternative transcriptions displayed in association with the respective estimated probabilities, and to allow the near-end user to select one of the alternative transcriptions from the list via the touchscreen user interface.

In another such embodiment, the client application may be operable to obtain a plurality of alternative transcriptions of said portion of speech, and for each a respective estimated probability of being correct; and the client application may be configured so as: in response to the estimated transcription being rejected by said one of the one or more second gestures indicating that the near-end user wishes another suggestion, to select only the next most probable alternative transcription, according to said estimated probabilities, with which to next present the near-end user; and to provide the near-end user with an option via the touchscreen user interface to accept or reject said next most likely alternative transcription to be sent to the one or more far-end users in said message. In one particular such embodiment, the client application may be configured so as: in response to each next most likely alternative transcription being rejected, to select only the next most likely alternative transcription after that, according to said estimated probabilities, with which to next present the near-end user; and to provide the near-end user with an option via the touchscreen user interface to accept or reject each next most likely alternative transcription to be sent to the one or more far-end users in said message.

Turning to the role of the transcription in the sent message, this may take a number of forms. For instance in embodiments, the message may comprises a video and an indication of a thumbnail image configured to provide a preview of the video at the one or more far-end terminals (e.g. an indication of a frame to use for the video image, or an explicitly included thumbnail image). In this case, the predetermined role of the transcription in the sent message may comprises inclusion in the thumbnail image. In embodiments, the message or at least the thumbnail image of the message may be sent to the one or more far-end user terminals by push notification.

Alternatively or additionally, where the message comprises audio and/or video, said predetermined role may comprise acting as subtitling of the audio and/or video.

Alternatively, the message may comprise an IM message or email having textual body, and said predetermined role may be to form part or all of the body of the message.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising:
   a microphone for capturing a portion of speech spoken by a near-end user of said user terminal;
   a network interface for connecting to a communication network;
   a touchscreen user interface;
   a communication client application configured to:
      conduct a communication session, over said communication network, between the near-end user and one or more far-end users of one or more far-end terminals, said communication session including an estimated transcription of said portion of speech that is capable of being sent in a message to the one or more far-end users;
      obtain a plurality of alternative transcriptions for said portion of speech including an estimated probability of being correct for each transcription of the plurality of alternative transcriptions;
      implement a vetting mechanism to allow the near-end user to vet the estimated transcription via the touchscreen user interface prior to the estimated transcription being sent in said message, the vetting mechanism including:
         a first gesture received at the touchscreen user interface indicating acceptance of the estimated transcription to be included in a predetermined role in the message; and
         one or more second gestures received at the touchscreen user interface indicating rejection of the estimated transcription from being included in said message; and
         in response to receiving an indication of the one or more second gestures, select a next most probable transcription from the plurality of alternative transcriptions according to the respective estimated probability of being correct, and present the next most probable transcription with an option to accept or reject the next most probable transcription via the touchscreen user interface to be sent in said message.

2. The user terminal of claim 1, wherein the communication client is further configured to send no transcription of said portion of speech to the one or more far-end users responsive to receiving an indication to abandon transcription.

3. The user terminal of claim 2, wherein the abandonment of the transcription comprises abandoning the sending of the message, or discarding from the sending a part of the message comprising said portion of speech.

4. The user terminal of claim 1, wherein the communication client application is further configured so as in response to the estimated transcription being rejected, to:
   capture a re-spoken version of said portion of speech from the near-end user, to obtain a new transcription of the re-spoken version, and provide the near-end user with an option via the touchscreen user interface to accept or reject the new transcription to be sent in said message.

5. The user terminal of claim 1, wherein the communication client application is further configured so as in response to the next most probable transcription being rejected, to:
   select a further next most probable alternative transcription, according to said estimated probabilities of being correct, and
   present the further next most probable alternative transcription with an option via the touchscreen user interface to accept or reject the further next most probable transcription to be sent in said message.

6. The user terminal of claim 1, wherein the communication client application is further configured so as in response to the next most probable transcription being rejected, to:
   present a list of at least some of the plurality of alternative transcriptions displayed in association with the respective estimated probability of being correct for each transcription with an option to select one of the plurality of alternative transcriptions from the list via the touchscreen user interface.

7. The user terminal of claim 1, wherein the message comprises a video and an indication of a thumbnail image configured to provide a preview of the video at the one or more far-end terminals, wherein said predetermined role comprises inclusion in the thumbnail image.

8. The user terminal of claim 1, wherein the message comprises audio and/or video, and said predetermined role comprises subtitling of the audio and/or video.

9. The user terminal of claim 1, wherein the message comprises an IM message or email having a textual body, and said predetermined role is as a part or all of the body of the message.

10. The user terminal of claim 1, wherein one or more of the first gesture and the one or more second gestures are each: a single gesture, a one or two dimensional gesture across the touchscreen user interface, and/or a gesture in a single straight-line direction across the touchscreen user interface.

11. The user terminal of claim 1, wherein the first gesture is performed in an opposite direction to one of the one or more second gestures.

12. The user terminal of claim 1, wherein the communication session is a bidirectional communication session between the near-end user and the one or more far-end users.

13. The user terminal of claim 1, wherein the communication client application is further configured to send an audio and/or video recording of said portion of speech to the one or more far-end users as part of said message.

14. The user terminal of claim 1, wherein the communication session is with only one far-end user.

15. The user terminal of claim 1, wherein the communication session is with multiple far-end users.

16. The user terminal of claim 1, wherein one of the estimated transcription or one of the plurality of alternative transcriptions includes a translation into a different language from a language in which the portion of speech is spoken.

17. A method comprising:
capturing a portion of speech spoken by a near-end user of a near-end user terminal;
operating the near-end user terminal to conduct a communication session, over a network, between the near-end user and one or more far-end users of one or more far-end terminals, the communication session including an estimated transcription for said portion of speech that is capable of being sent in a message to the one or more far-end users;
obtaining a plurality of alternative transcriptions for said portion of speech including an estimated probability of being correct for each transcription of the plurality of alternative transcriptions;
implementing a vetting mechanism via a touchscreen user interface of the near-end user terminal, to allow the near-end user to vet an estimated transcription of said portion of speech prior to being sent to the one or more far-end users in said message, wherein said vetting mechanism includes a first gesture received at the touchscreen user interface indicating acceptance of the estimated transcription to be included in a predetermined role in said message and one or more second gestures received at the touchscreen user interface indicating rejection of the estimated transcription from being included in said message; and
responsive to receiving an indication of the one or more second gestures, selecting a next most probable transcription from the plurality of alternative transcriptions according to the respective estimated probability of being correct, and presenting the next most probable transcription with an option to accept or reject the next most probable transcription via the touchscreen user interface to be sent in said message.

18. A computer-readable storage medium storing program code that is executable on a near-end user terminal to perform operations comprising:
capturing a portion of speech spoken by the near-end user;
operating the near-end user terminal to conduct a communication session, over a network, between the near-end user and one or more far-end users of one or more far-end terminals, the communication session including an estimated transcription of said portion of speech that is capable of being sent in a message to the one or more far-end users;
obtaining a plurality of alternative transcriptions for said portion of speech including an estimated probability of being correct for each transcription of the plurality of alternative transcriptions;
implementing a vetting mechanism via a touchscreen user interface of the near-end user terminal to allow the near-end user to vet the estimated transcription prior to being sent in said message, wherein said vetting mechanism includes a first gesture received at the touchscreen user interface indicating acceptance of the estimated transcription to be included in a predetermined role in said message and one or more second gestures received at the touchscreen user interface indicating rejection of the estimated transcription from being included in said message; and
responsive to receiving an indication of the one or more second gestures, selecting a next most probable transcription from the plurality of alternative transcriptions according to the respective estimated probability of being correct; and
presenting the next most probable transcription with an option to accept or reject the next most probable transcription via the touchscreen user interface to be sent in said message.

19. A method as recited in claim 17, wherein the first gesture comprises a swipe gesture in a first direction, and wherein the one or more second gestures comprise a swipe gesture in a second direction opposite the first direction.

20. The user terminal of claim 1, wherein the communication session comprises a video messaging conversation and/or a voice call.

* * * * *